UNITED STATES PATENT OFFICE.

JAMES D. CULP, OF GILROY, CALIFORNIA.

IMPROVEMENT IN CURING TOBACCO.

Specification forming part of Letters Patent No. 135,468, dated February 4, 1873.

*To all whom it may concern:*

Be it known that I, JAMES D. CULP, of Gilroy, county of Santa Clara, and State of California, have invented a new and useful Improvement in the art of Curing Tobacco; and I hereby declare the following to be a full, clear, and exact description thereof.

My invention relates particularly to the curing of tobacco designed to be used for chewing-tobacco; and it consists in fermenting the tobacco before it is dried, and by one fermentation only, whereby I am enabled to preserve in the leaf a larger proportion of the saccharine matter produced during the curing.

Heretofore, tobacco has been cured by hanging the plants until they are thoroughly dried, and are then subjected to a series of alternate fermentations and dryings.

In order that those skilled in the art may practice and use my process, I shall proceed to describe the manner in which I have carried it out.

When the plants are cut I hang them up until they turn yellow, which usually takes from one to two weeks. I prefer to hang the plants in a horizontal position in the manner described in my patent of January 30, 1872, and No. 123,154, although my process will work well if the plants are hung in the ordinary manner. After the leaves yellow, I take down the plants and pile them for fermentation, the length of the plants forming the width of the pile. The piles may be of any convenient length, but their height depends somewhat upon the temperature. At a temperature of (70°) seventy degrees Fahrenheit, a height of two feet I find sufficient. A greater height to the pile will create a greater fermentation. The tobacco should not be piled at a temperature much below 70° Fahrenheit. When the tobacco is piled at a lower temperature, the commencement of fermentation is accelerated by using great care in piling the tobacco very compactly, and making the piles more than two feet high. The plants being thus piled will ferment, and the piles should be deep enough so that they will sufficiently ferment within about twenty-four hours. Suitable means should be had for retaining the heat within the piles until it permeates the whole mass equally. I prefer to do this by merely having upon the top of the pile two layers of plants which act as a covering, and which I remove from the fermented plants when the operation is completed. I do not find it necessary to handle or change the plants during fermentation. The fermentation should progress until the pile has reached a temperature of about 110° Fahrenheit, when the starch in the leaf will be found partially or wholly converted into saccharine matter. The fermentation should not continue to such an extent that the juices of the plant will yield alcohol. When the plants have sufficiently fermented the color of the leaves will be a light brown with a reddish shade; they will have a sweet taste and smell, so that the color, taste, and smell of the leaves furnish tests of their sufficient fermentation. When the plants have sufficiently fermented, as described, I hang them up until they are thoroughly dried, after which they are treated and manufactured by the usual well-known methods.

By this method I hold that I can produce a superior quality of cured tobacco suitable for manufacturing into chewing-tobacco, and can produce a much larger percentage of first-grade tobacco from a given quantity of tobacco-plants than can be produced by any other known process.

Having thus described my invention, what I claim as new, and desire to secure by Letters Patent, is—

The process of curing tobacco, as herein described, consisting of hanging the tobacco till it yellows, piling it in the usual manner, subjecting it to fermentation until the starch is turned to saccharine matter, and subsequently drying it, substantially as set forth.

JAMES DARIUS CULP.

Attest:
R. K. EVANS,
ALONZO HUGHES.